United States Patent
Edwards et al.

(10) Patent No.: US 12,238,486 B2
(45) Date of Patent: Feb. 25, 2025

(54) MANAGEMENT OF AUDIO PERFORMANCE IN A VEHICLE

(71) Applicant: GM GLOBAL TECHNOLOGY OPERATIONS LLC, Detroit, MI (US)

(72) Inventors: Ryan M. Edwards, Shelby Township, MI (US); Russell A. Patenaude, Macomb Township, MI (US); Eric T. Hosey, Royal Oak, MI (US); Matthew Neely, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 262 days.

(21) Appl. No.: 17/884,618

(22) Filed: Aug. 10, 2022

(65) Prior Publication Data

US 2024/0056751 A1 Feb. 15, 2024

(51) Int. Cl.
*H04R 29/00* (2006.01)
*B60R 21/015* (2006.01)
*H04B 17/309* (2015.01)

(52) U.S. Cl.
CPC ..... *H04R 29/001* (2013.01); *B60R 21/01544* (2014.10); *H04B 17/309* (2015.01); *H04R 2499/13* (2013.01)

(58) Field of Classification Search
CPC ........ H04N 7/186; H04N 7/185; H04N 7/181; H04N 19/132; H04N 23/51; H04N 7/18; H04N 7/183; H04W 12/02; H04W 12/08; H04W 4/023; H04W 4/021; H04W 12/069; H04W 12/63; H04W 4/027; H04W 4/40; H04W 4/50; H04W 68/005; H04L 43/00; H04L 43/0876; H04L 63/0421; H04L 67/535; H04L 63/108; H04L 65/612; H04L 65/762; H04L 67/306; H04L 9/3263; H04L 47/801; H04L 65/1089; H04L 65/611; H04L 65/75; H04L 67/62; B60R 1/04; B60R 1/12; B60R 1/26; B60R 16/0373; B60R 2001/1215; B60R 21/01544; B60R 2300/305; B60R 2300/8026; B60R 2300/804; B60R 2300/8093; B60T 7/122; H04B 17/309; H04M 1/72403; H04M 1/724098; H04M 2250/60;

(Continued)

(56) References Cited

U.S. PATENT DOCUMENTS 11,189,270 B2 * 11/2021 Takahashi ........... G10L 15/1815
11,928,390 B2 * 3/2024 Mistry .................... G10L 17/22

(Continued)

*Primary Examiner* — Lun-See Lao
(74) *Attorney, Agent, or Firm* — Quinn IP Law

(57) ABSTRACT

A system for managing audio performance in a vehicle includes an audio unit having one or more speakers and one or more microphones respectively positioned in and/or around the vehicle. The speakers transmit an audio signal within the vehicle. A command unit is in communication with the audio unit. The command unit has a processor and tangible, non-transitory memory on which instructions are recorded. The command unit is adapted to receive the audio signal through the one or more microphones and determine whether at least one audio quality parameter of the audio signal meets a predefined threshold. The command unit may be adapted to take at least one remedial action when the audio quality parameter is below the predefined threshold.

17 Claims, 4 Drawing Sheets

(58) Field of Classification Search
CPC ........... H04M 2250/74; H04R 2420/07; H04R 2499/13; H04R 29/001; H04R 3/12; H04R 5/04
USPC .................................. 381/56–59, 86; 700/94
See application file for complete search history.

(56) References Cited

U.S. PATENT DOCUMENTS

| | | | |
|---|---|---|---|
| 2009/0158360 A1* | 6/2009 | Diab | .................... H04L 47/821 |
| | | | 725/75 |
| 2020/0189501 A1* | 6/2020 | Kim | .................... B60R 11/0217 |
| 2021/0072866 A1* | 3/2021 | Srail | ...................... B60K 35/10 |
| 2023/0178093 A1* | 6/2023 | Yamanashi | ........... G10L 21/028 |
| | | | 704/233 |

\* cited by examiner

MANAGEMENT OF AUDIO PERFORMANCE IN A VEHICLE

INTRODUCTION

The present disclosure relates generally to a system and method for managing audio performance in a vehicle. It is an undeniable facet of modern life that many people spend a considerable amount of time in their vehicles, while being transported from one place to another. Many consumers listen to various audio recordings, hear vehicle signals or chimes and receive calls through their vehicle's audio system. The expectations of sound quality within a vehicle have increased for many consumers. However, the audio quality may be compromised at times due to environmental noise and other factors.

SUMMARY

Disclosed herein is a system for managing audio performance in a vehicle. The system includes an audio unit having one or more speakers and one or more microphones respectively positioned in and/or around the vehicle. The speakers transmit an audio signal within the vehicle. A command unit is in communication with the audio unit. The command unit has a processor and tangible, non-transitory memory on which instructions are recorded. The command unit is adapted to receive the audio signal through the one or more microphones and determine whether at least one audio quality parameter of the audio signal meets a predefined threshold. The command unit may be adapted to take at least one remedial action when the audio quality parameter is below the predefined threshold.

The audio signal may be expected at a specific time with a specific sound (such as a prompt, chime or tone), with the command unit being adapted to confirm that the audio signal is being played within the vehicle as expected. The audio signal may include pulses. The audio quality parameter may include at least one of: frequency of the pulses in the audio signal, pattern of the pulses, respective length time of the pulses and respective separation time between the pulses.

In some embodiments, the command unit may be adapted to reset and/or reboot the audio unit when the at least one audio quality parameter is below the predefined threshold. The command unit may be adapted to switch to a back-up speaker and a back-up microphone when the at least one audio quality parameter is below the predefined threshold. The audio signal may be divided into a relatively higher priority group and a relatively lower priority group, the command unit being adapted to selectively disable the one or more speakers when the audio signal is in the relatively lower priority group.

In some embodiments, the command unit is adapted to increase sensitivity of the one or more speakers and/or the one or more microphones nearest to one or more occupants in the vehicle when the at least one audio quality parameter is below the predefined threshold. The system may include one or more occupants sensors adapted to respectively detect presence of an occupied vehicle seat in the vehicle. The command unit may be adapted to obtain locations of the one or more occupants based in part on the one or more occupant sensors. The system may include one or more seatbelt sensors adapted to respectively detect seatbelt buckling status of respective vehicle seats. The command unit may be adapted to obtain locations of the one or more occupants based in part on the one or more seatbelt sensors.

In some embodiments, the command unit may be adapted to identify at least one audio improvement zone within the vehicle where the at least one audio quality parameter is below the predefined threshold and identify one or more passenger listening zones within a respective predefined distance of one or more occupants in the vehicle. The command unit is adapted to determine an overlap zone of the audio improvement zone and the passenger listening zones, and selectively increase sensitivity of the one or more speakers in the overlap zone and selectively disable and/or reduce volume of the one or more speakers outside the overlap zone. The audio unit may include a respective speaker and a respective microphone embedded in a mobile device of an occupant of the vehicle.

Disclosed herein is a method for managing audio performance in a vehicle in communication with a command unit having a processor and tangible, non-transitory memory on which instructions are recorded. The method includes installing one or more speakers and one or more microphones respectively in or around the vehicle as part of an audio unit. An audio signal is transmitted through e speakers in the vehicle. The method includes receiving the audio signal through the microphones and determining whether at least one audio quality parameter of the audio signal meets a predefined threshold, via the command unit.

The above features and advantages and other features and advantages of the present disclosure are readily apparent from the following detailed description of the best modes for carrying out the disclosure when taken in connection with the accompanying drawings.

Figure 1:
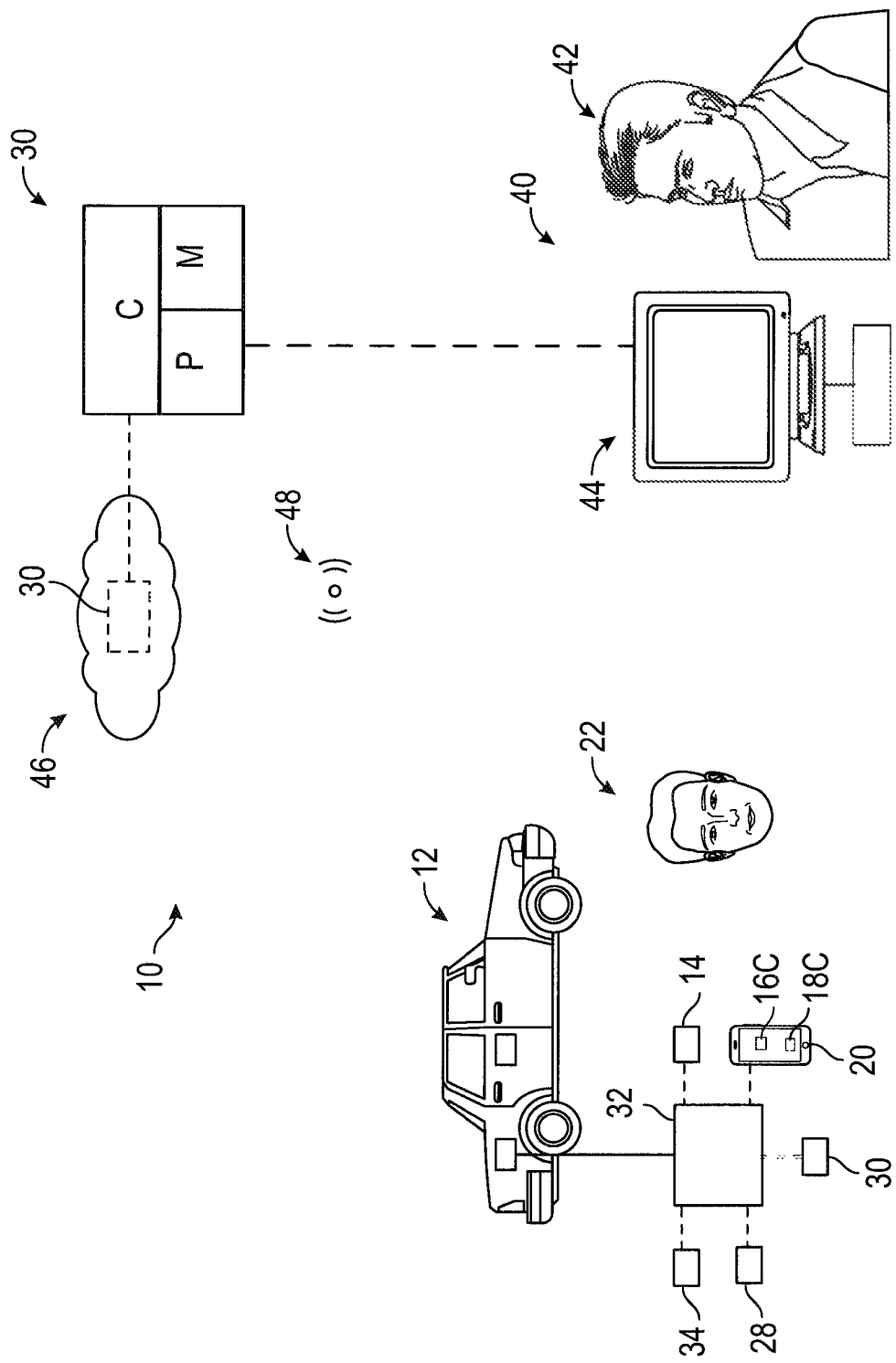
FIG. 1 is a schematic fragmentary diagram of a system for managing audio performance in a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for managing audio performance of an audio unit 14 in a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

Figure 2:
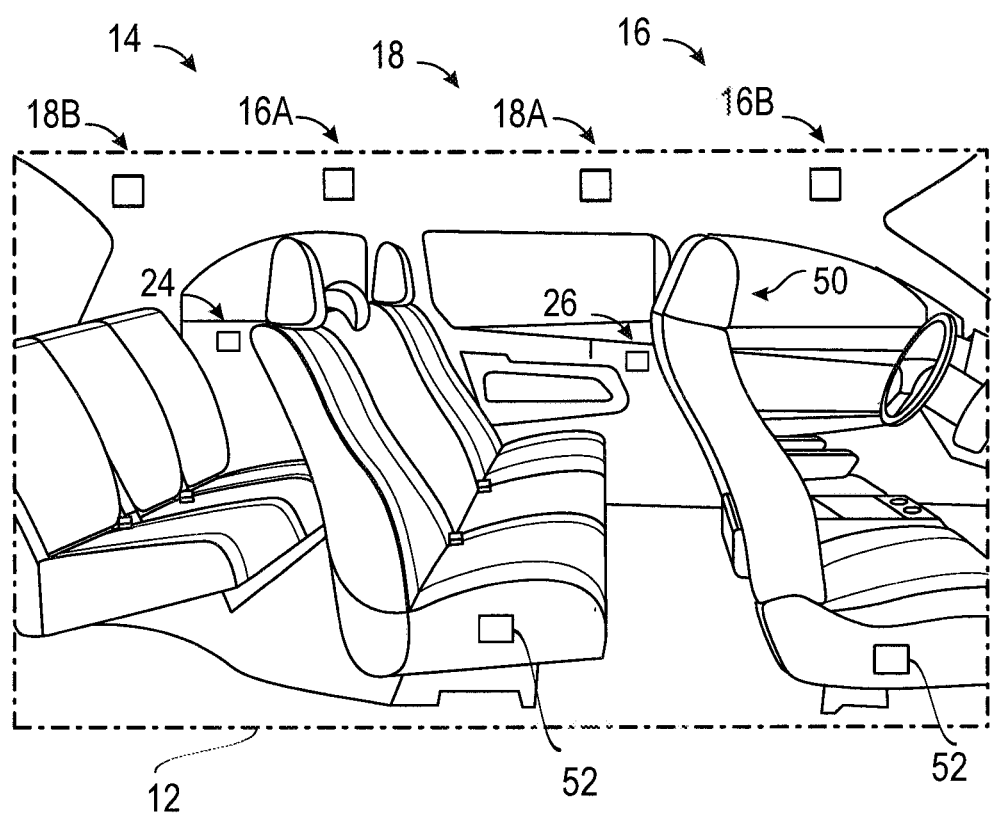
FIG. 2 is a schematic fragmentary perspective view of an interior of the vehicle of FIG. 1.

FIG. 2 is a schematic fragmentary perspective view of an interior of the vehicle 12. The audio unit 14 in FIG. 2 includes one or more receivers, referred to herein as microphones 16, and one or more transmitters, referred to herein as speakers 18, respectively positioned at various points in or around the vehicle 12. The distribution of the microphones 16 and speakers 18 may be selected based on the application at hand.

Referring to FIG. 2, the microphones 16 may include an analog microphone 16A and a digital microphone 16B. The speakers 18 may include an analog speaker 18A and a digital speaker 18B. The microphones 16 and speakers 18 may be embedded in occupant devices. For example, referring to FIG. 1, a microphone 16C and a speaker 18C may be embedded in the mobile device 20 of an occupant 22. Referring to FIG. 2, the audio unit 14 may include a backup audio path with a backup microphone 24 and a backup speaker 26. The system 10 may include a backup battery 28 to power the audio unit 14. The audio unit 14 may include other components available to those skilled in the art such as a processor, sound mixer, amplifier etc. (not shown).

The types of audio signals broadcasted by the audio unit 14 may include, but are not limited to, chimes (e.g., from seatbelt sensors alerting to an unbuckled state), click-clacks (e.g., from the hazard lights being activated), beeping sounds (e.g., from a lane departure warning module), ringtone from an incoming voice call (e.g., coming through a telematics module 34), car theft alarm, transmission from radio (AM, FM and satellite), compact disc, DVD and other types of media.

Referring to FIG. 1, the system 10 includes a command unit 30 having an integrated controller C with at least one processor P and at least one memory M (or non-transitory, tangible computer readable storage medium) on which instructions are recorded for a method 200 (described below with respect to FIG. 4). The memory M can store command unit-executable instruction sets, and the processor P can execute the command unit-executable instruction sets stored in the memory M.

As described below, the system 10 (via execution of method 200) uses the microphones 16 to listen for audio cues that indicate that the sounds that are expected or requested for playback are being generated properly for reception by the occupants 22 in the vehicle 12. The command unit 30 is adapted to take remedial action when at least one audio quality parameter is below a predefined threshold. Also as described below, in the event that audio quality is limited near the occupant 22, the system 10 may boost microphone sensitivity and speaker volume of the nearest microphone 16 or speaker 18 within the vehicle 12 and/or or activate the backup microphone 24 and backup speaker 26. In the event that audio quality is compromised due to unwanted environmental noise at a location away from an occupant 22, the system 10 may disable one or more of the microphones 16 or attenuate relatively lower priority audio (such as click-clacks) until the components nearest the occupant 22 meet the required operation.

The system 10 is beneficial in many instances. For example, the system 10 may address a situation where the occupants are conversing with emergency services and are unable to hear them (or vice versa). Furthermore, the system 10 may address a complete loss of audio during a concerning situation.

Referring to FIG. 1, the vehicle 12 includes a vehicle controller 32 collecting information from the audio unit 14. The vehicle 12 may include a telematics module 34 for establishing two-way communications with the command unit 30, including recording and transmitting the data from the audio unit 14. The telematics module 34 may further collect telemetry data, such as location, speed, engine data, maintenance requirements and servicing, by interfacing with various internal sub-systems. The telematics module 34 may enable vehicle-to-vehicle (V2V) communication and/or a vehicle-to-everything (V2X) communication.

The information obtained by the command unit 30 may be sent to a remote assistance unit 40, as shown in FIG. 1. The remote assistance unit 40 may be manned electronically and/or by a remote advisor 42 having access to an electronic device 44 such as a desktop computer, laptop, tablet, cell phone or wearable device. The audio performance monitoring is used to ensure that communications with the remote advisor 42 are smooth. Calls to the remote assistance unit 40 may be made through the telematics module 34, which may include an OnStar™ module.

Referring to FIG. 1, the command unit 30 may be hosted or based out of a remotely located cloud computing service 46. The cloud computing service 46 may include one or more remote servers hosted on the Internet to store, manage, and process data. The cloud computing service 46 may be at least partially managed by personnel at various locations. Alternatively, the command unit 30 may be embedded in the vehicle controller 32. If the vehicle 12 is part of a fleet, the command unit 30 may be embedded in a master or leader vehicle.

The system 10 may employ a wireless network 48 for communications between the vehicle 12 and the command unit 30, shown in FIG. 1. The wireless network 48 may be a short-range network or a long-range network. The wireless network 48 may be a communication BUS, which may be in the form of a serial Command unit Area Network (CAN-BUS). In some embodiments, the telematics module 34 and analog microphone 16A may see communication BUS messages, be aware of ongoing calls to the remote assistance unit 40, and otherwise be notified that an audio signal is expected. If not, the system 10 may fall back to alternate audio paths as well as report the issue to the occupant 22 and remote assistance unit 40.

The wireless network 48 may be a serial communication bus in the form of a local area network. The local area network may include, but is not limited to, a Command unit Area Network (CAN), a Command unit Area Network with Flexible Data Rate (CAN-FD), Ethernet, Bluetooth, WIFI and other forms of data. The wireless network 48 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Referring now to FIG. 2, a flowchart of an example method 200 of operating the system 10 is shown. Method 200 need not be applied in the specific order recited herein. Furthermore, it is to be understood that some blocks may be eliminated. In some embodiments, method 200 may be embodied as computer-readable code or stored instructions and may be at least partially executable by the command unit 30 and/or the vehicle controller 32. The start and end of the method 200 are indicated by the letters "S' and "E."

Figure 4:
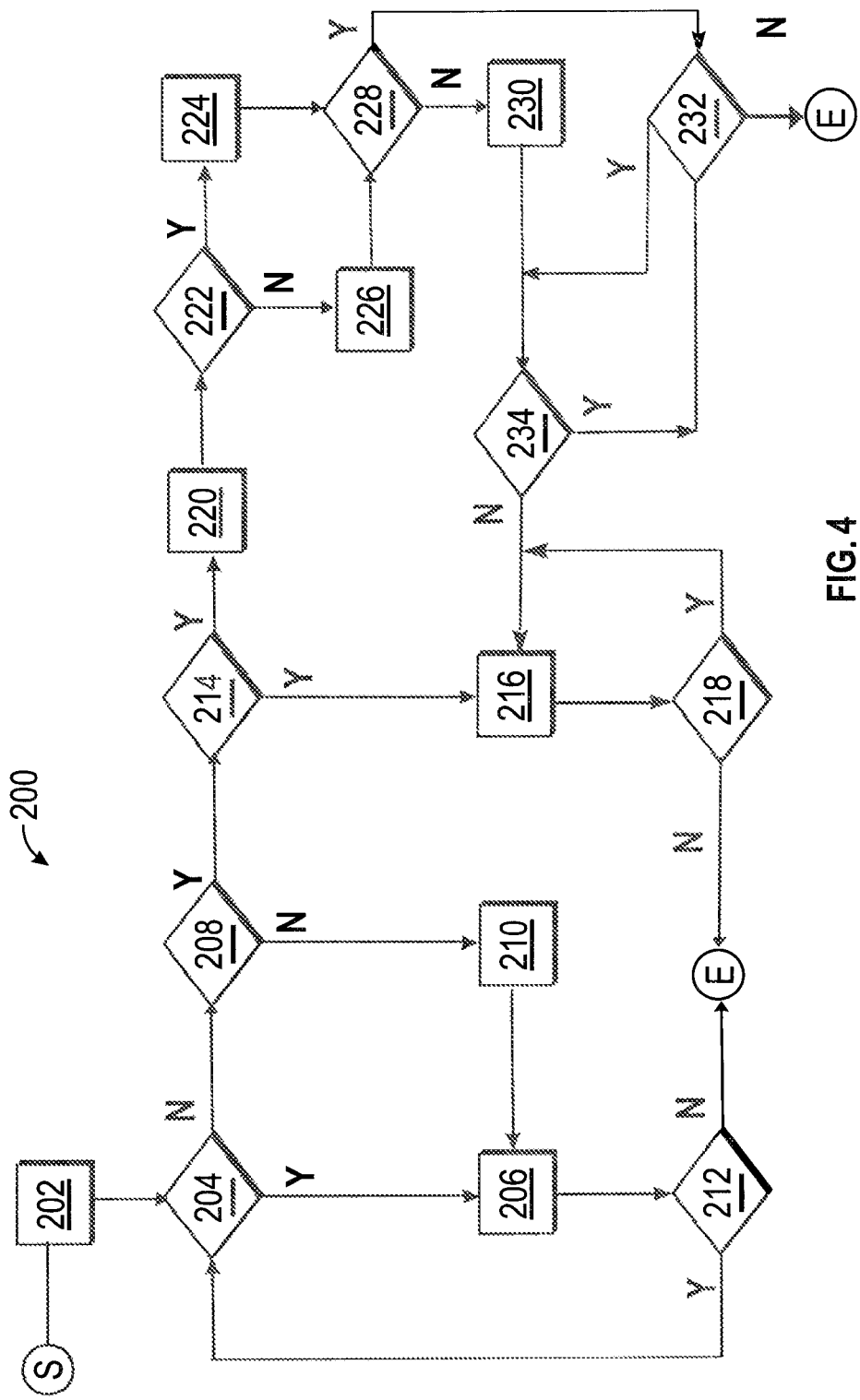
FIG. 4 is a flowchart for a method of operating the system of FIG. 1.

Beginning at block 202 of FIG. 4, the method 200 includes initiating the managing routine. The command unit 30 may broadcast an audio signal (through the speakers 18) of a recognizable tune or sound (e.g., a chime at a specific tone and frequency) at the beginning of the managing routine, listen to the audio signal through the microphones 16 (shown in FIG. 1-2) and determine the status of one or more predefined audio quality parameters. The audio signal broadcasted through the speakers 18 may be a live call from the remote advisor 42.

Advancing to block 204, the method 200 includes determining whether at least one audio quality parameter of the audio signal meets a predefined threshold. The audio quality parameters may include amplitude, frequency, cadence and duration of a signal. The audio signal may include pulses that repeat in a specific pattern, with the audio quality parameters being frequency and intensity of each pulse in the audio signal, repetition or pattern of the pulses, pulse length time (e.g., how long the beeps, chimes or other sounds last) and separation time (time between the pulses). In one example, the frequency of the audio signal is between about 500 Hz and 900 Hz.

If the audio quality parameters meet the predefined threshold (block 204=YES), the method 200 proceeds to block 206, where the command unit 30 is adapted to continue monitoring audio performance of the one or more microphones 16. Per block 204, if the audio quality parameters do not meet the predefined threshold (block 204=NO), the method 200 proceeds to block 208, where the command unit 30 is adapted to determine if the audio category is in a predefined priority group. The audio signal broadcasted through the speakers 18 may be divided into a relatively higher priority group and a relatively lower priority group. The relatively higher priority group may include warnings (e.g., from a lane departure warning module), reminders (e.g., triggered by a seatbelt sensors) and incoming calls from the remote assistance unit 40. For example, the relatively lower priority group may include click-clacks from hazard lights, transmissions from radio (AM, FM and satellite), compact disc, DVD and other types of media.

Per block 208, if the audio category is not in the relatively higher priority group (block 208=NO), the method 200 proceeds to block 210 where the audio unit 14 is reset or rebooted. As shown in FIG. 4, block 210 advances to block 206, which in turn advances to block 212 to determine whether the audio signal is still playing. If the audio signal is no longer playing (block 212=NO), the method 200 is ended. If the audio signal is still playing (block 212=YES), the method 200 loops back to block 204.

Per block 208, if the audio category is in the relatively higher priority group (block 208=YES), the method 200 proceeds to block 214 to determine if microphone data is available. If microphone data is not available (block 214=NO), the method 200 proceeds to block 216. Per block 216, the command unit 30 is adapted to employ the backup audio path (with backup microphone 24 and backup speaker 26 shown in FIG. 2) and/or the vehicle controller 32 is adapted to present a visual alert to the occupant 22 (see FIG. 1) of the vehicle 12 that microphone data is not available. As shown in FIG. 4, block 216 advances to block 218 to determine whether the audio signal is still playing. If the audio signal is no longer playing (block 218=NO), the method 200 is ended. If the audio signal is still playing (block 218=YES), the method 200 loops back to block 216.

Per block 214, if microphone data is available (block 214=YES), the method 200 proceeds to block 220 to attenuate audio signals from the relatively lower priority group. Advancing to block 222 from block 220, the method 200 determines whether the microphones 16 that are nearest to the occupant 22 are available, i.e., comparing the respective locations of the occupants 22 and the microphones 16 to determine which of the microphones 16 are closest.

The command unit 30 may be adapted to obtain the respective locations of the occupants 22 via occupant sensors 52 in the vehicle 12. Referring to FIG. 2, the vehicle seats 50 may be respectively equipped with occupant sensors 52. The occupant sensors 52 may detect occupancy status by using a weight estimate, such as a load/weight applied to the vehicle seats 50 being at or above a predetermined seat-load range. This determination may be carried out, for example, via a fluid-filled pouch placed under the vehicle seats 50 coupled to a pressure sensor, which provides an electrical output signal to the vehicle controller 32 indicative of the fluid pressure exerted on the pouch.

Figure 3:
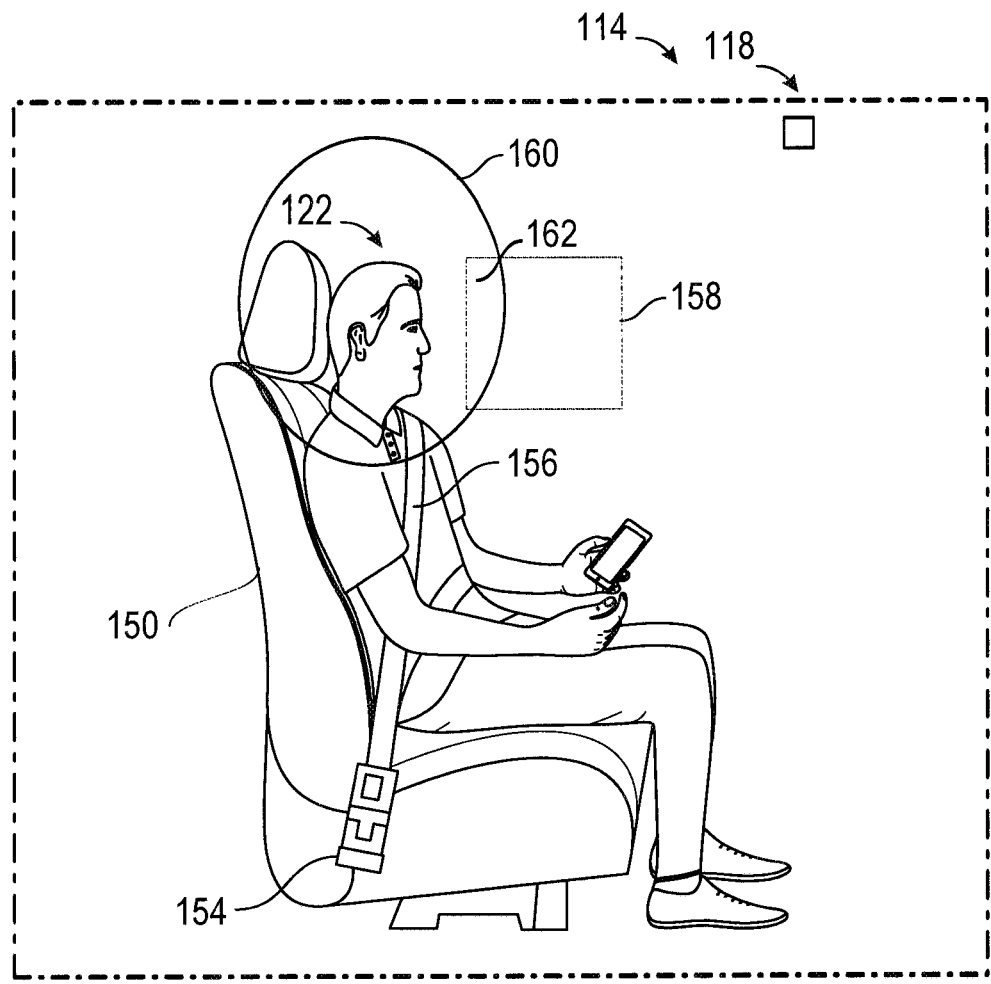
FIG. 3 is a schematic fragmentary perspective view of an example vehicle seat.

In some embodiments, the respective locations of the occupants 22 may be obtained through the use of seatbelts sensors. Referring to FIG. 3, an example vehicle seat 150 is equipped with a seatbelt sensor 154 which detects the seatbelt buckling status of the seatbelt 156. If the seatbelt sensor 154 indicates a buckled status, this may be taken as confirmation that the vehicle seat 150 has an occupant 122 seated on it.

Referring back to block 222 of FIG. 4, if the microphones 16 nearest to the occupant 22 are available (block 222=YES), the method 200 proceeds to block 224 to disable the other microphones (i.e., not nearest to the occupant 22). If the nearest microphones 16 are not available (block 222=NO), the method 200 proceeds to block 226 to boost microphone sensitivity at the next closest or nearest location to the occupant 22.

From block 226 and block 224, the method 200 advances to block 228 to determine if the audio quality parameters of the audio signal meet the predefined threshold. If the audio quality parameters do not meet the predefined threshold (block 228=NO), the method 200 proceeds to block 230 to increase speaker volume. If the audio quality parameters meet the predefined threshold (block 228=YES), the method 200 proceeds to block 232 to determine if the audio signal is still playing.

Per block 232, if the audio signal is no longer playing (block 232=NO), the method 200 is ended. If the audio signal is still playing (block 232=YES), the method 200 advances to block 234 to determine if the audio quality parameters meet the predefined threshold. If the audio quality parameters meet the predefined threshold (block 234=YES), method 200 loops to block 232. If the audio quality parameters do not meet the predefined threshold (block 234=NO), method 200 heads over to block 216 to repeat the steps described above. This creates a feedback loop with useful information transmitted to the remote assistance unit 40 (e.g., OnStar™).

In some embodiments, the method 200 may include identifying at least one audio improvement zone 158 (see FIG. 3) within the vehicle 12 where the audio quality parameters are respectively below a predefined threshold. Additionally, the method 200 may include identifying at least one passenger listening zone 160 within a respective predefined distance of an occupant 122 (see FIG. 3). The predefined distance may be set as an optimal hearing distance. The location of the occupant 122 may be confirmed via an occupant sensor 52 (see FIG. 2) and/or seatbelt sensor 154 (see FIG. 3).

Additionally, referring to FIG. 3, the method 200 may include determining an overlap zone 162 of the audio improvement zone 158 and the passenger listening zone 160. The command unit 30 may selectively increase sensitivity of the speaker 118 in the audio unit 114 that is nearest to the overlap zone 162. The command unit 30 may selectively decrease the volume of the speakers 18 that are outside of or farthest from the overlap zone 162.

In summary, an effective way of managing and boosting audio performance is disclosed for a vehicle 12. The system 10 enables the use of audio cues to existing audio playback to test overall performance. Specifically, certain tones, chimes, and other audio signals that happen at specific times are monitored to ensure they are played and heard within the vehicle 12 as expected. For example, when the telematics module 34 is informed (or sees on the CAN bus) by the vehicle controller 32 that the lane departure warning signal is triggered, the system 10 may search for the audio signal to match the amplitude, frequency, cadence, duration, etc. that is expected from the lane departure warning signal.

The system 10 enables the use of occupancy sensors 52 to confirm occupant locations and disable specific microphones, dynamically increase specific microphone sensitivity or speaker volume or attenuate specific audio, based on the occupant locations in the vehicle 12.

The command unit 30 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that can direct a command unit or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for managing audio performance in a vehicle, the system comprising:
    an audio unit having one or more speakers and one or more microphones respectively positioned in or around the vehicle, the one or more speakers transmitting an audio signal within the vehicle;
    a command unit in communication with the audio unit, the command unit having a processor and tangible, non-transitory memory on which instructions are recorded;
    wherein the audio signal is expected at a specific time with a specific sound and the command unit is adapted to confirm that the audio signal is played within the vehicle as expected based in part on microphone data from the one or more microphones;
    wherein the command unit is adapted to:
        receive the audio signal through the one or more microphones and determine whether at least one audio quality parameter of the audio signal meets a predefined threshold;

when the at least one audio quality parameter is below the predefined threshold, divide the audio signal into a relatively higher priority group and a relatively lower priority group;

reset and/or reboot the audio unit when the audio signal is in the relatively lower priority group;

disable the audio signal from the relatively lower priority group when the audio signal is in the relatively higher priority group and the microphone data is available; and switch to a back-up speaker and a back-up microphone when the audio signal is in the relatively higher priority group and the microphone data is not available.

2. The system of claim 1, wherein the audio signal includes pulses and the at least one audio quality parameter includes at least one of: frequency of the pulses in the audio signal, pattern of the pulses, respective length time of the pulses and respective separation time between the pulses.

3. The system of claim 1, wherein the command unit is adapted to increase sensitivity of the one or more speakers and/or the one or more microphones nearest to one or more occupants in the vehicle when the at least one audio quality parameter is below the predefined threshold.

4. The system of claim 3, further comprising:

one or more occupants sensors adapted to respectively detect presence of an occupied vehicle seat in the vehicle;

wherein the command unit is adapted to obtain locations of the one or more occupants based in part on the one or more occupant sensors.

5. The system of claim 3, further comprising:

one or more seatbelt sensors adapted to respectively detect seatbelt buckling status of respective vehicle seats; and wherein the command unit is adapted to obtain locations of the one or more occupants based in part on the one or more seatbelt sensors.

6. The system of claim 1, wherein the command unit is adapted to:

identify at least one audio improvement zone within the vehicle where the at least one audio quality parameter is below the predefined threshold; and identify one or more passenger listening zones within a respective predefined distance of one or more occupants in the vehicle.

7. The system of claim 6, wherein the command unit is adapted to:

determine an overlap zone of the at least one audio improvement zone and the one or more passenger listening zones; and selectively increase sensitivity of the one or more speakers in the overlap zone and selectively disable and/or reduce volume of the one or more speakers outside the overlap zone.

8. The system of claim 1, wherein the audio unit includes a respective speaker and a respective microphone embedded in a mobile device of an occupant of the vehicle.

9. The system of claim 1, wherein the command unit is adapted to, present a visual alert to an occupant of the vehicle that the microphone data is not available when the audio signal is in the relatively higher priority group and the microphone data is not available.

10. The system of claim 1, wherein the relatively higher priority group includes a vehicle warning from a lane departure warning module and/or a seatbelt reminder.

11. The system of claim 1, wherein the relatively higher priority group includes incoming calls from a remote assistance unit.

12. The system of claim 1, wherein the relatively lower priority group includes respective transmissions from radio and/or compact discs.

13. A method for managing audio performance in a vehicle in communication with a command unit having a processor and tangible, non-transitory memory on which instructions are recorded, the method comprising:

installing one or more speakers and one or more microphones respectively in or around the vehicle as part of an audio unit;

transmitting an audio signal through the one or more speakers in the vehicle;

receiving the audio signal through the one or more microphones;

confirming that the audio signal is played within the vehicle as expected based in part on microphone data from the one or more microphones, wherein the audio signal is expected at a specific time with a specific sound;

determining whether at least one audio quality parameter of the audio signal meets a predefined threshold, via the command unit;

dividing the audio signal into a relatively higher priority group and a relatively lower priority group when the at least one audio quality parameter is below the predefined threshold;

resetting and/or rebooting the audio unit when the audio signal is in the relatively lower priority group;

disabling the audio signal from the relatively lower priority group when the audio signal is in the relatively higher priority group and the microphone data is available; and switching to a back-up speaker and a back-up microphone when the audio signal is in the relatively higher priority group and the microphone data is not available.

14. The method of claim 13, further comprising:

increasing sensitivity of the one or more speakers and/or one or more microphones nearest to one or more occupants in the vehicle when the at least one audio quality parameter is below the predefined threshold.

15. The method of claim 14, further comprising:

obtaining respective locations of the one or more occupants based in part on one or more occupant sensors adapted to detect presence of an occupied seat in the vehicle.

16. The method of claim 14, further comprising:

obtaining respective locations of the one or more occupants based in part on one or more seatbelt sensors adapted to detect seatbelt buckling status of seats in the vehicle.

17. The method of claim 13, further comprising:

presenting a visual alert to an occupant of the vehicle that the microphone data is not available when the audio signal is in the relatively higher priority group and the microphone data is not available.

* * * * *